United States Patent [19]
Timmons et al.

[11] Patent Number: 5,646,507
[45] Date of Patent: Jul. 8, 1997

[54] BATTERY CHARGER SYSTEM

[75] Inventors: John B. Timmons, Winston-Salem; David P. Boden, Pfafftown, both of N.C.; Larry D. Stahl, Arlington, Tex.

[73] Assignee: Douglas Battery Manufacturing Company, Winston-Salem, N.C.

[21] Appl. No.: 728,132

[22] Filed: Oct. 3, 1996

Related U.S. Application Data

[63] Continuation of Ser. No. 141,484, Oct. 22, 1993, abandoned.
[51] Int. Cl.[6] .................................................. H01M 10/46
[52] U.S. Cl. ......................................... 320/21; 320/43
[58] Field of Search ................................ 320/5, 9, 4, 30, 320/43, 44, 45, 48, 21

[56] References Cited

U.S. PATENT DOCUMENTS

| | | | |
|---|---|---|---|
| 3,898,547 | 8/1975 | Poole | 320/2 |
| 3,979,657 | 9/1976 | Yorksie | 320/13 |
| 4,912,392 | 3/1990 | Faulknr | 320/44 |
| 5,107,191 | 4/1992 | Lowndes et al. | 318/139 |
| 5,115,182 | 5/1992 | Ehmke et al. | 320/14 |
| 5,119,011 | 6/1992 | Lambert | 320/43 |
| 5,144,218 | 9/1992 | Bosscha | 320/44 |
| 5,263,565 | 11/1993 | Wilkinson | 194/216 |
| 5,274,320 | 12/1993 | Yamaguchi | 320/31 |
| 5,349,535 | 9/1994 | Gupta | 320/48 |
| 5,444,353 | 8/1995 | Shinohara et al. | 320/39 |

*Primary Examiner*—Edward Tso
*Attorney, Agent, or Firm*—Rhodes, Coats & Bennett, LLP.

[57] ABSTRACT

A direct current power source for powering an electric vehicle. The power source has a rechargeable battery and a battery charger control unit for providing a charge to the battery with an amount of electrical energy which corresponds to the amount of electrical energy discharged since the previous charge plus a selected additional amount of charge to slightly overcharge the battery during a full restoration. The battery charger control unit includes a charge monitor for determining the flow of electrical energy into and out of the battery and a charge controller for controlling a battery charger. In one embodiment, the battery and the battery charger control unit are integrated. In the preferred embodiment, the charge controller includes means for controlling the battery charger in accordance with the amount of electrical energy charged to and discharged from the battery as measured by the charge monitor. In addition, the charge controller may include means for controlling a function of the vehicle in accordance with the amount of electrical energy charged to and discharged from the battery as measured by the charge monitor.

28 Claims, 7 Drawing Sheets

BATTERY CHARGER SYSTEM

This application is a continuation of application Ser. No. 08/141,484 filed Oct. 22, 1993, abandoned.

BACKGROUND OF THE INVENTION (1) Field of the Invention

The present invention relates generally to power sources for electric vehicles and, more particularly, to an integrated rechargeable battery and battery charger control unit for powering electric vehicles.

(2) Description of the Prior Art

Typically, rechargeable batteries, particularly lead acid batteries (for example, flooded calcium, valve regulated, and flooded antimonial batteries), for electric vehicles are made as either stand alone units with a separate charger or as combination units where the battery and charger are contained in the same holding tray. In either case, the battery and charger operate independently of each other. The battery is plugged into the vehicle for discharge and then unplugged from the vehicle and subsequently plugged into the charger to be recharged.

Present battery chargers for such types of batteries are typically designed such that they will always put a minimum amount of charge in a battery regardless of the original state of charge of the battery. That is, they generally charge for a set period of time at full charge before sensing a battery's state of charge and finishing at low charge. Present chargers do not compensate for the state of charge existing on the battery at the time charging commences. Therefore the charger will provide the same amount of charge to a battery which has been 1% discharged as to a battery that has been 80% discharged. As a result, such chargers will overcharge batteries that are not fully discharged. Overcharging causes excessive corrosion and deterioration of the battery.

In the applications for which vehicular batteries are used, such as forklift trucks and general transport vehicles, it is generally inconvenient to have to fully discharge a battery and then fully charge the battery. For most chargers, recharging takes several hours. It would be much more convenient if batteries could be charged to their full capacity regardless of their initial state of charge. That is, whether a battery's charge has been depleted by 25%, 50%, or 100%, it would be more convenient and faster to recharge, returning to the battery only that portion of the charge which has been used.

Vehicular batteries such as lead acid batteries may also be damaged by over-discharge. In the past, this damage has been obviated by the provision of commercially available low voltage indicators which can be fitted to an electric vehicle to warn the operator.

U.S. Pat. No. 3,979,657 discloses a battery monitor for disabling a selected operative function, such as the lift on a forklift, when the battery reaches a predetermined discharge state. U.S. Pat. No. 3,898,547 discloses an electric vehicle battery charger interlock system which prevents a vehicle from being driven while the batteries are being charged, and which prevents activation of the charger until the direct current connection of the battery charger to the electric vehicle is completed.

U.S. Pat. No. 5,144,218 discloses a device for determining the charge condition of a small appliance battery. The device comprises a current-frequency converter which generates pulses of a frequency dependent on the battery charge or discharge current. These pulses are counted and used to determine the battery charge condition. The device further comprises correction means which detects an actual battery charge condition for correcting the charge condition determined by pulses. The disclosure teaches the use of the device with appliances and rechargeable electric shavers.

U.S. Pat. No. 4,912,392 discloses a battery charge state monitor having a charging circuit for charging nickel cadmium batteries of the type used for portable computers. An integrating circuit generates a waveform having a frequency proportional to the rate of charging and discharging of the cells. During initial calibration, the number of pulses generated for an exact known quantity of charge is stored in a microprocessor. During subsequent use and charging of the cells, the counter counts in one direction during charging and in the opposite direction during discharge. Since the frequency of the pulses generated is directly proportional to the rate of charge and discharge, the count of the counter provides an exact indication of the state of charge of the cells.

Thus, there remains a need for an improved charger control apparatus which provides for safe recharge of vehicular batteries, whether fully or partially discharged. Further, there remains a need for such a battery charger control apparatus which can disable selected functions of an associated vehicle when the battery is discharged to a predetermined level and/or while the battery is being charged. There also remains a need for an integrated or combined battery and intelligent charger controller.

SUMMARY OF THE INVENTION

The present invention is directed to an integrated rechargeable battery and battery charger control unit for electric vehicles such as forklift trucks, golf carts, and electric automobiles and vans. The term integrated, as used herein, means that the battery and battery charger control unit are combined with and carried by the vehicle. Where beneficial, a battery charger may be integrated with the battery and the battery charger control unit.

The battery charger control unit includes a charge monitor which continually monitors the flow of electrical energy into and out of the battery, and a charge controller which inputs and processes the output of the charge monitor. The charge monitor may monitor the flow of electrical energy by measuring current flow, voltage, or by any other appropriate method. The charge controller further includes logic to continually calculate the sum of the electrical energy charged into and discharged from the battery over time, which corresponds directly to the charge condition of the battery. A reference value is programmed into the control logic and corresponds to equalization or full charge. When the battery charger control unit is used in conjunction with a battery charger which is connected to an external alternating current power source, it will cause the charger to charge the battery according to its programmable logic using the equalization value and the electrical energy integration value (which is monitored and recalculated throughout the recharge process) as reference numbers. In the preferred embodiment, the programmable logic will cause the charger to recharge the battery to 103–110% of its equalization value.

The term "automatic", as used herein, means the battery charger control unit operates to accomplish a particular action or function without requiring additional input from the user.

It is therefore an object of the present invention to provide an integrated battery and battery charger control unit for vehicular and lead acid batteries such as valve regulated batteries, flooded antimonial batteries, and flooded calcium batteries.

It is another object of the present invention to provide a battery charger control unit that is capable of charging a rechargeable battery with an amount of electrical energy which is directly based on the amount of electrical energy discharged since the last charging of the battery. More particularly, the present invention provides a battery charger control unit which is capable of automatically charging a rechargeable battery with an amount of electrical energy equal to the amount of electrical energy discharged from the battery since the battery's last charge.

Alternatively or in addition, it is an object of the present invention to provide a battery charger control unit capable of automatically charging a rechargeable battery with an amount of electrical energy equal to the amount of electrical energy discharged from the battery since the battery's last charge plus a selected amount of overcharge proportional to the amount discharged since the last charging.

Still another object of the present invention is to provide an integrated rechargeable battery and battery charger control unit for use with an electric forklift truck or other electrically powered vehicle.

Another object of the present invention is to provide an integrated rechargeable battery control unit and battery charger for use with a rechargeable battery.

A further object of the present invention is to provide a battery charger control unit capable of locking out one or more other functions of an associated vehicle at prescribed times.

These and other objects of the present invention will become apparent to those skilled in the art after a reading of the following description of the preferred embodiment when considered with the drawings.

DESCRIPTION OF THE PREFERRED EMBODIMENTS

Figure 1:
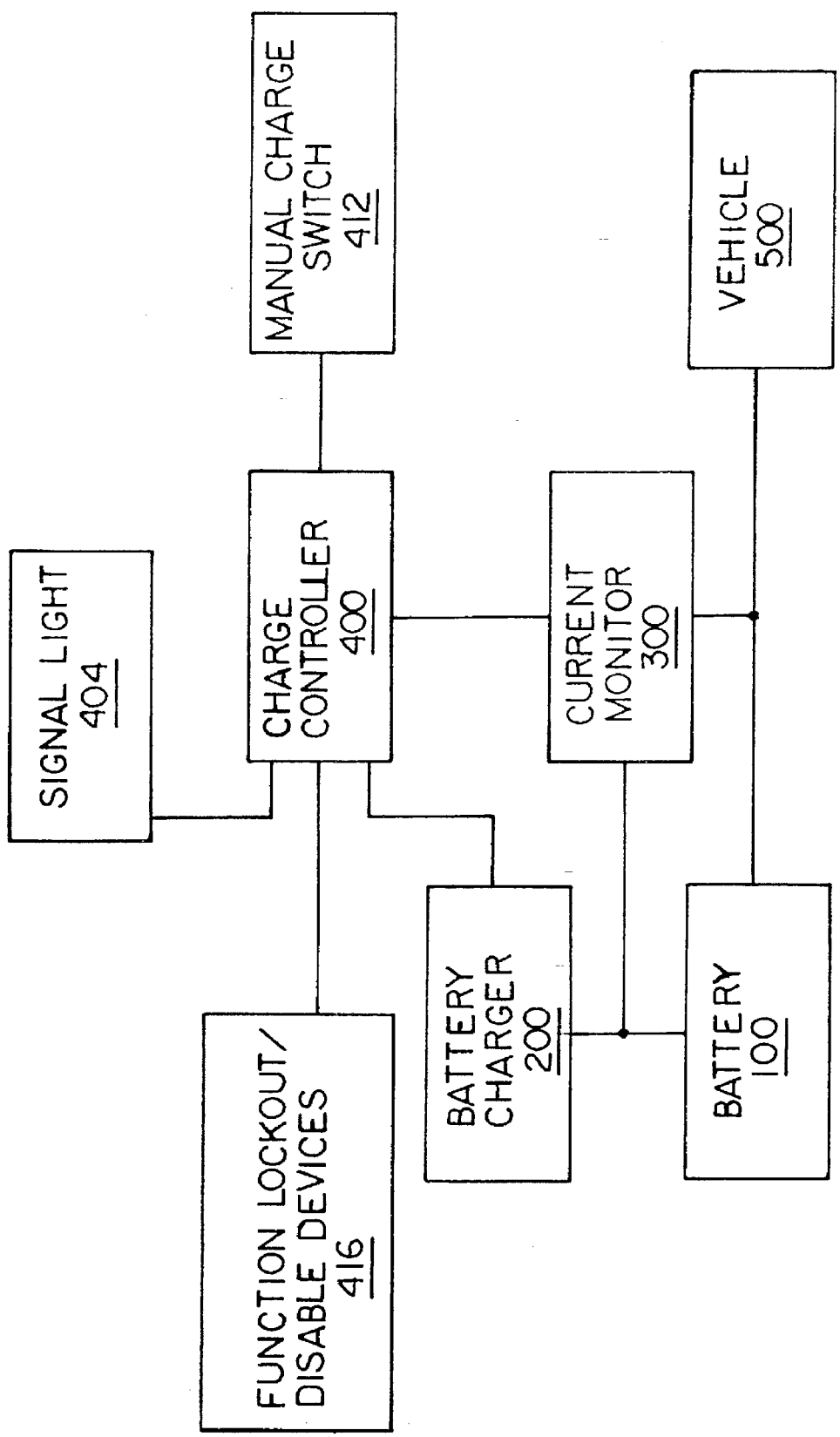
FIG. 1 is a block diagram of the battery charger control unit of the present invention with an associated battery, battery charger and vehicle.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. The invention is described as it may be used in conjunction with a forklift vehicle, but it will be understood that it could be utilized in conjunction with a wide range of electric vehicles having a variety of functions and features. It should further be understood that the figures, particularly the electrical leads, are drawn for clarity. For most applications it will be desirable to construct many of the leads as unexposed contacts rather than as exposed cables as shown. Likewise, it may be advantageous to place all or most of the various components of the battery charger control unit and/or the battery charger in a single housing.

The preferred embodiment will depend upon the intended application. In many applications, particularly where a large or heavy charger is required, it will be advantageous to maintain the charger separate from the vehicle. In the embodiment described hereinafter, the charger is combined with the battery and/or the battery charger control unit.

In the preferred embodiment as hereinafter described, the parameter measured in order to determine the amount of electrical energy charged to and discharged from the battery is current flow (measured in ampere-hours). Therefore, the charge monitor forming a part of the present invention corresponds to a current monitor. It will be understood that any parameter quantitatively corresponding to electrical energy may be measured to accomplish the purposes of the present invention, and any suitable technique for measuring that parameter may be used.

Figure 5:
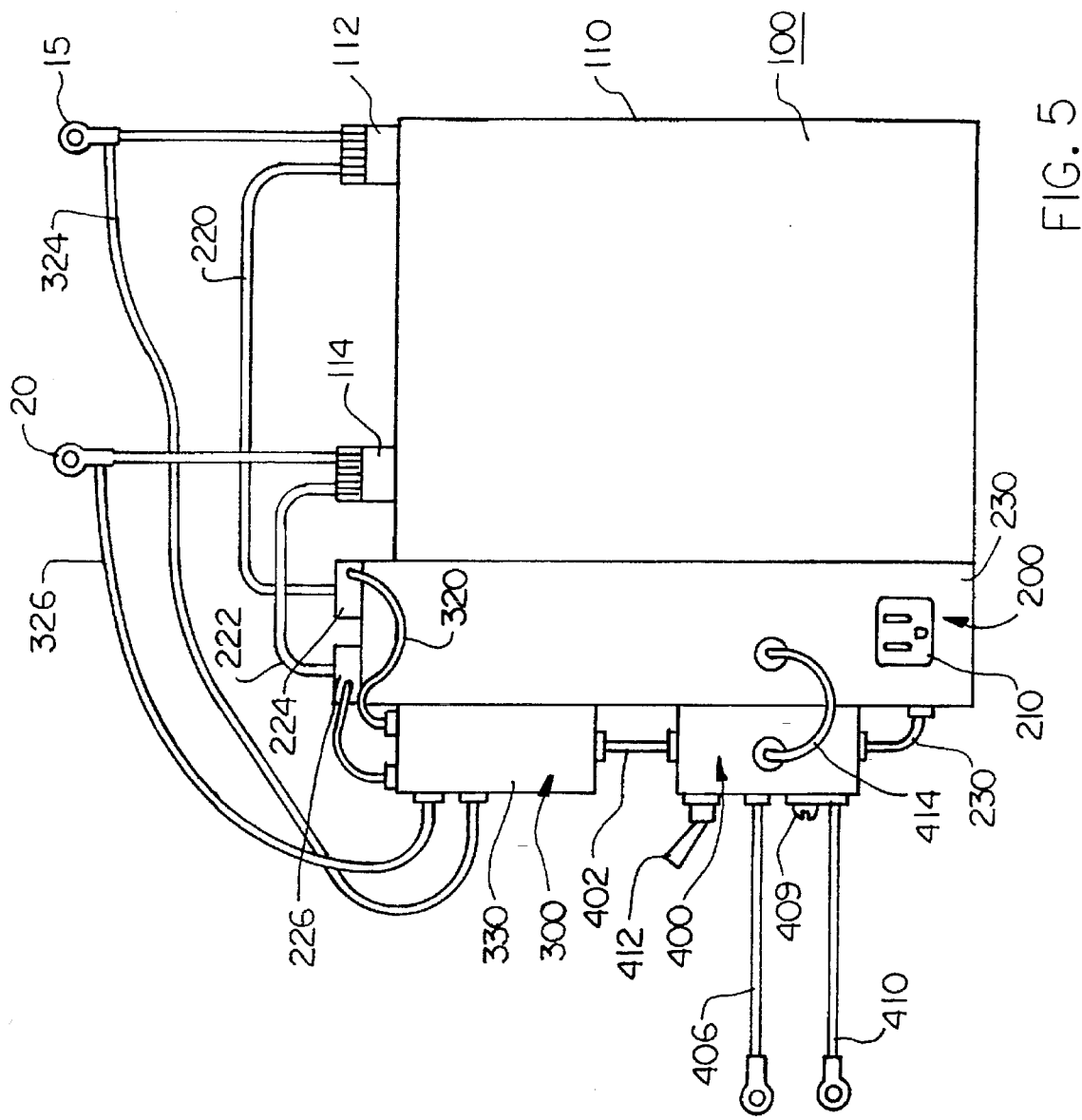
FIG. 5 is a side elevational view of the battery charger control unit of the present invention with a rechargeable battery and a battery charger.
Figure 6:
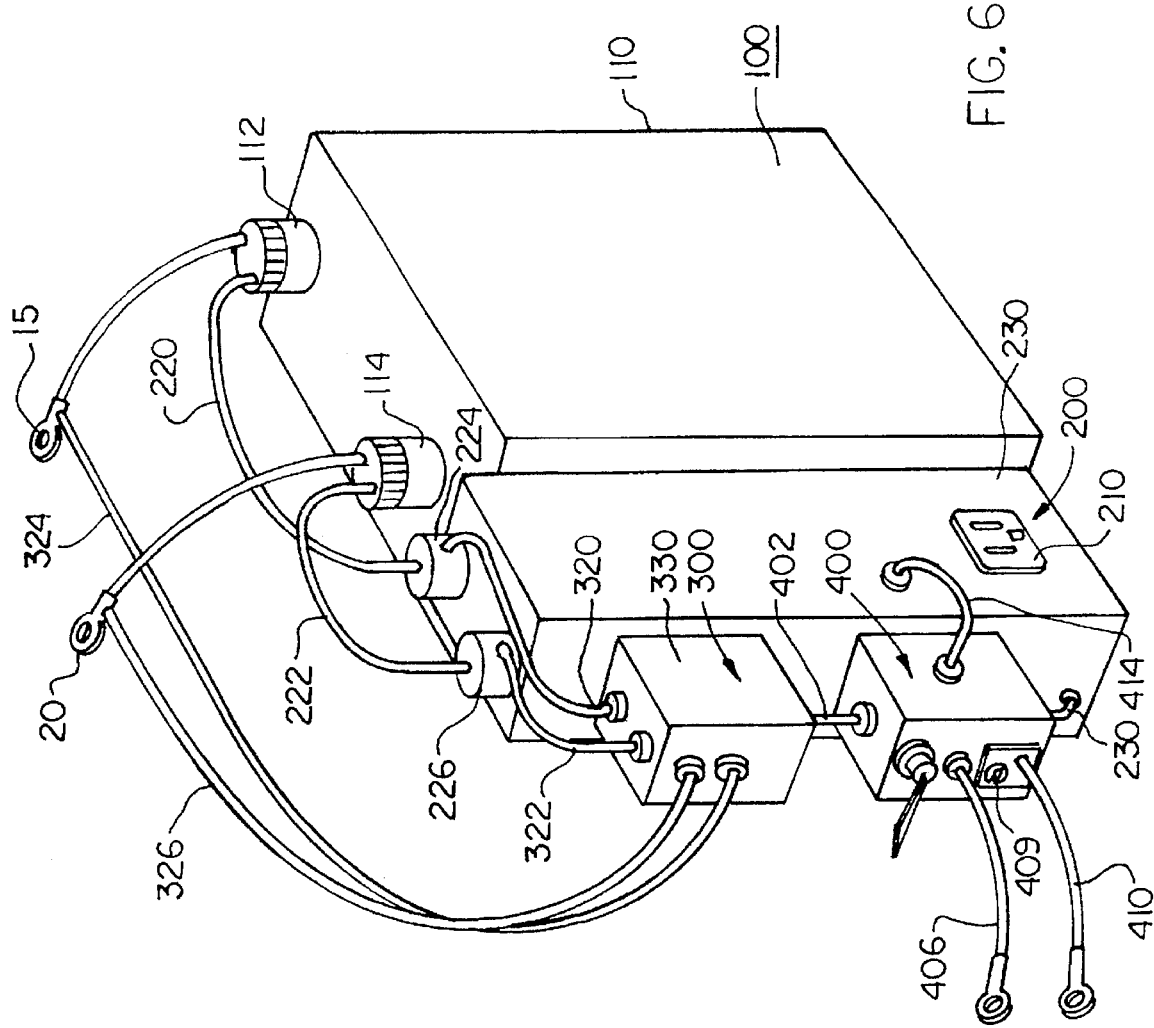
FIG. 6 is a perspective view of the battery charger control unit of the present invention with a rechargeable battery and a battery charger.

The battery charger control unit of the present invention is denoted generally by the numeral 10. As best seen in FIG. 5, battery charger control unit 10 includes current monitor 300 and charge controller 400. Battery charger control unit 10 is designed for use with a rechargeable battery 100 and a charger 200. Depending on the intended application, battery charger control unit 10 may be designed to be affixed to battery 100 or removable from battery 100.

In conventional fashion, battery 100 has case 110, positive terminal 112 and negative terminal 114. Positive and negative leads 15,20 electrically connect the battery terminals to the power supply input terminals of ane associated vehicle.

Positive and negative leads 220,222 electrically connect battery terminals 112,114 to positive and negative terminals 224,226 of charger 200. The terminals are mounted on charger case 230. Charger 200 has conventional electrical socket 210 for receiving a conventional electrical plug of an external alternating current power source.

Positive and negative leads 320,322 electrically connect charger terminals 224,226 to current monitor 300. Ampere-hour meter 330 is operative to measure the current flow across charger terminals 224,226 and therefore can measure the ampere-hours charged to battery 100 through leads 220,222. Positive and negative leads 324,326 electrically connect monitor 300 to vehicle leads 15,20, allowing ampere-hour meter 330 to measure the ampere-hours discharged from the battery to the vehicle.

The ampere-hour readings from monitor 300 are transmitted to the programmable logic 440 of charge controller 400 via lead 402. Manual charge switch 412 is operatively connected to programmable logic 440. Lift lock-out lead 406 electrically connects charge controller 400 to a lift lock-out device which serves to disable the lift function of the forklift. Vehicle disable lead 410 electrically connects charge controller 400 to a vehicle disable device which serves to disable the locomotive function of the forklift. Signal light 404 is mounted on the outside of charge controller 400. Charge status signals (i.e., charging or not charging, charge error, charge completed, non-initialized battery, etc.) are transmitted from charger 200 to charge controller 400 via lead 230. Charger control signals are transmitted from charge controller 400 to charger 200 via lead 414.

Figure 2:
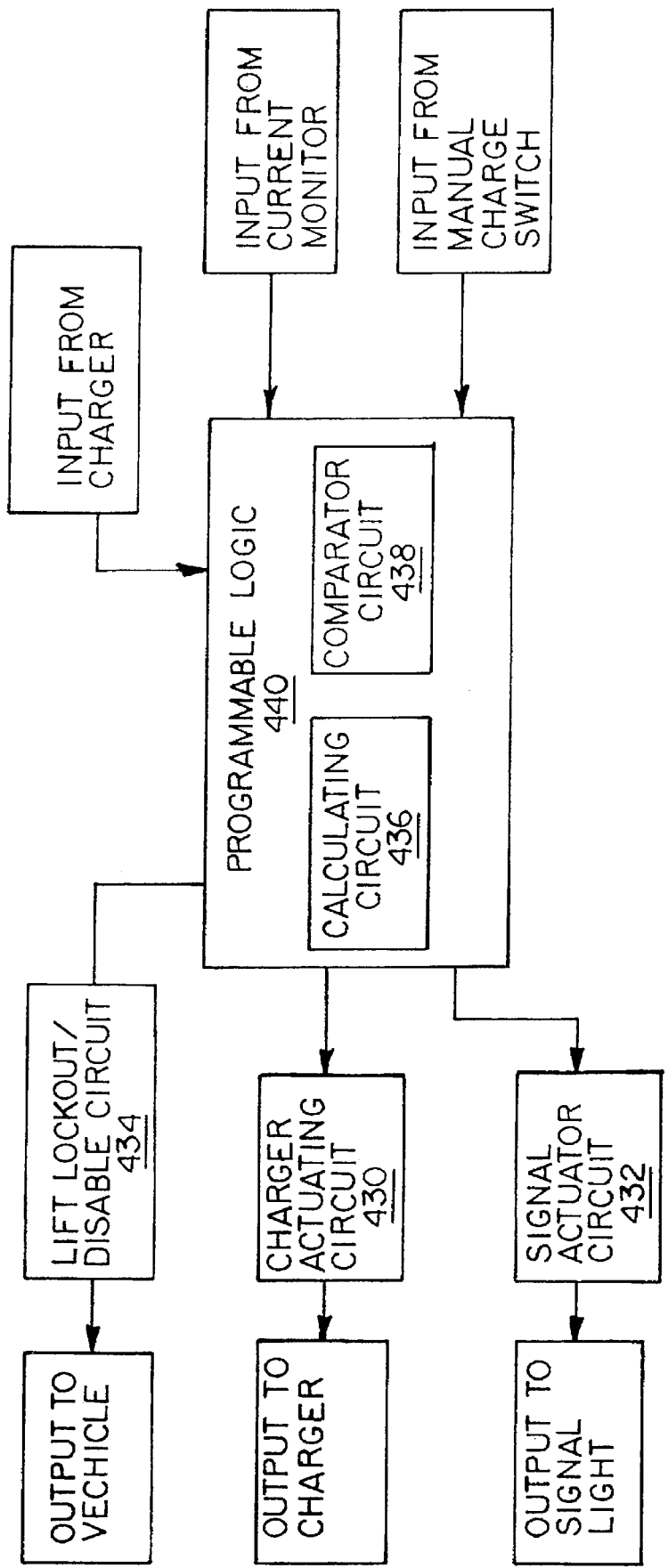
FIG. 2 is a functional block diagram of the charge controller forming a part of the present invention.

Turning now to FIG. 2, a functional block diagram of charge controller 400 is shown therein. Charge controller 400 has programmable logic 440 which processes input signals from charger 200, monitor 300, and manual charge switch 412. Calculating circuit 436 serves to integrate over time the ampere-hour signals from monitor 300. Comparator circuit 438 compares the integration value outputted from calculator circuit 436 to a reference value. The operation of programmable logic 440 is described more fully hereinafter. Output from programmable logic 440 may be to any of the three actuator circuits: 1) lift lock-out/disable circuit 434; 2) charge actuating circuit 430; and 3) signal actuating circuit 432. Circuit 434 will output an appropriate signal to disable the lift function of the forklift and/or to disable the locomotive function of the forklift. Circuit 430 will provide an appropriate signal to the charger causing it to cease charging or resume charging at a particular voltage and current. Circuit 432 will cause signal light 404 to illuminate. The pattern of illumination of signal light 404 will be indicative of the status of battery charger unit 10, as will be detailed hereinafter. Signal light 404 can be replaced or supplemented by other signal means, such as audible signals.

Figure 3:
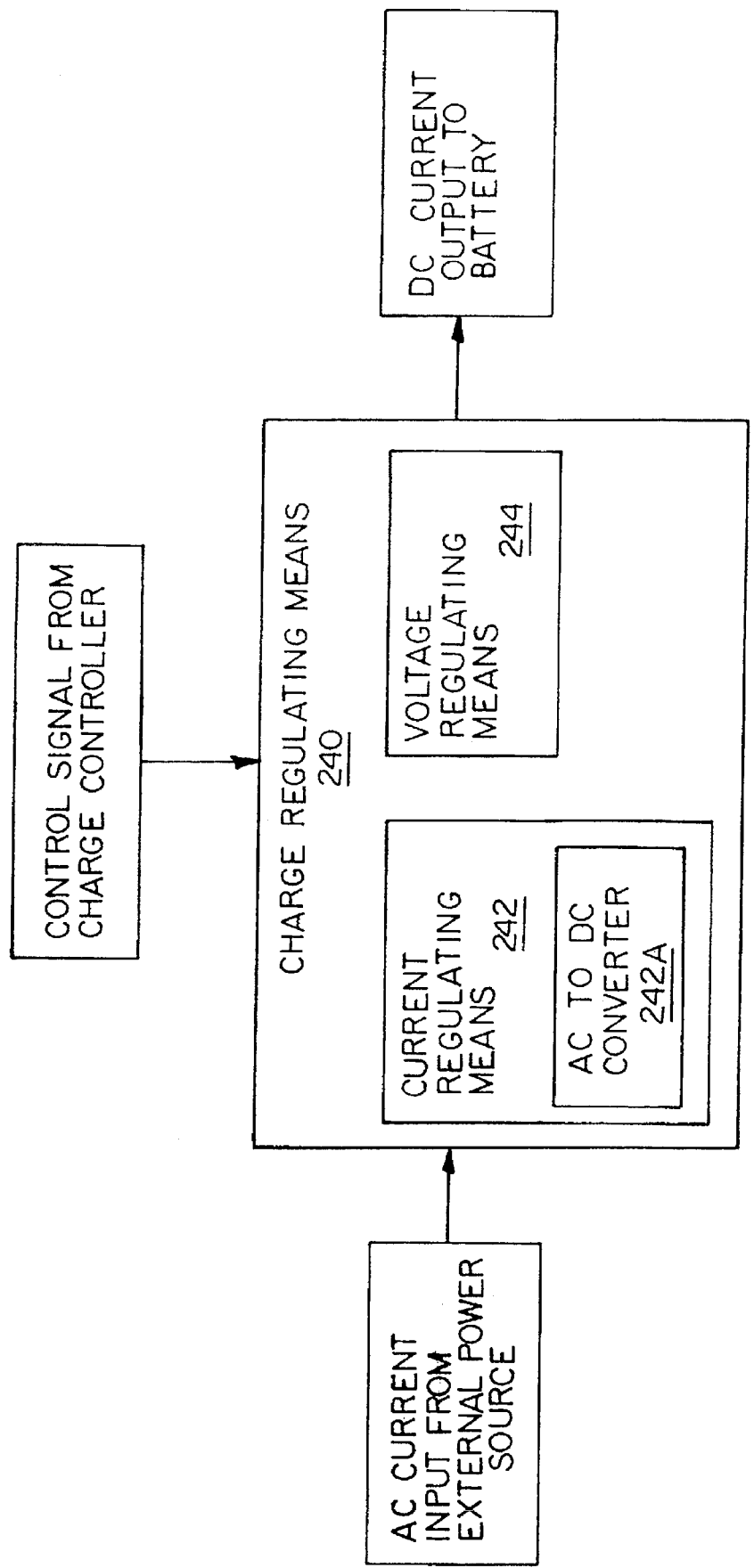
FIG. 3 is a functional block diagram of the battery charger forming a part of the present invention.

Turning now to FIG. 3, battery charger 200 is shown therein in functional block form. Battery charger 200 has charge regulating means 240 for interpreting and acting upon instruction signals from charge controller 400. Forming a part of charge regulating means 240 are conventional current regulating means 242 and voltage regulating means 244. Forming a part of current regulating means 242 is an alternating current to direct current converter (AC/DC converter) 242a. AC current that is inputted to charger 200 via socket 210 will be outputted to battery 100 as DC current at a voltage and current level commanded by charge controller 400.

Figure 4:
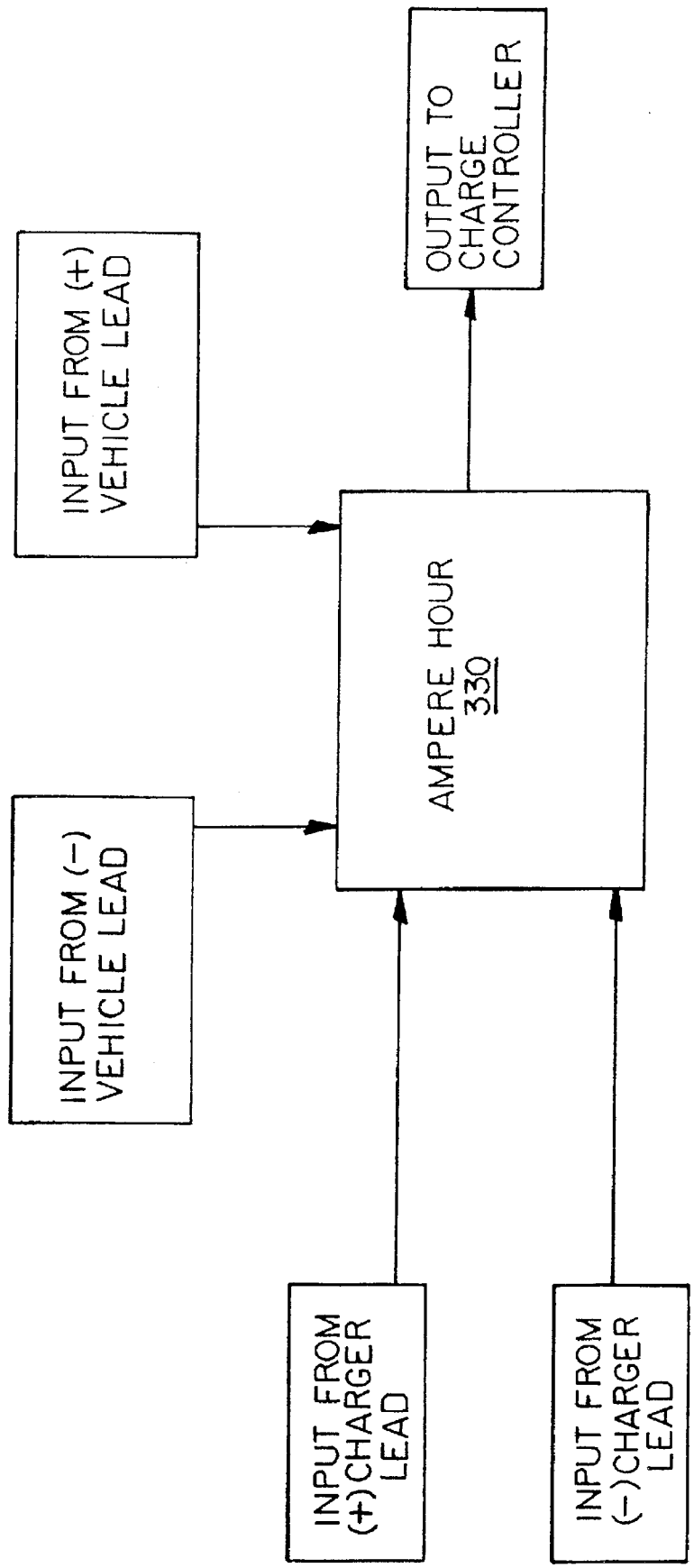
FIG. 4 is a functional block diagram of the current monitor which forms a part of the present invention in one embodiment.

Turning now to FIG. 4, ampere-hour meter 330 of monitor 330 is shown therein in functional block diagram form. As mentioned above, ampere-hour meter 330 will maintain two sets of measurements: 1) the current flow across charger leads 220,222 which will be reported to charge controller 400 as a negative ampere-hour value; and 2) current flow across vehicle leads 15,20 which will be reported to charge controller 400 as a negative ampere-hour value. Hence, charging of battery 100 is measured as a negative value and discharging of battery 100 is measured as a positive value.

In operation, all aspects of the charging process are controlled by charge controller 400. Charge controller 400 maintains a measure of the battery's charge status. Monitor 300 signals charge controller 400 for each ampere-hour charged to and discharged from the battery. Starting with a fully charged battery and a total state of discharge value (hereinafter C(tot)) of zero, charge controller 400 adds to C(tot) for each ampere-hour discharged from the battery and subtracts from C(tot) for each ampere-hour charged to the battery. The value of C(tot) is continuously compared to a first reference value, C(low), which corresponds to the state of discharge at which the user wishes to be alerted and an alert is given when this state of discharge is reached. The value of C(tot) is likewise continuously compared with a second reference value, C(lock), which corresponds to the state of discharge at which the user wants to disable the lift function of the vehicle. When charger 200 is plugged in to a power source, charge controller 400 will automatically regulate the charger such that the actual number of ampere-hours returned to the battery will be 100% of the ampere-hours discharged from the battery since its last charge plus a designated overcharge. Additionally, the charge controller is equipped with a manual charge button to fully charge or equalize a new battery before putting it to use.

Figure 7:
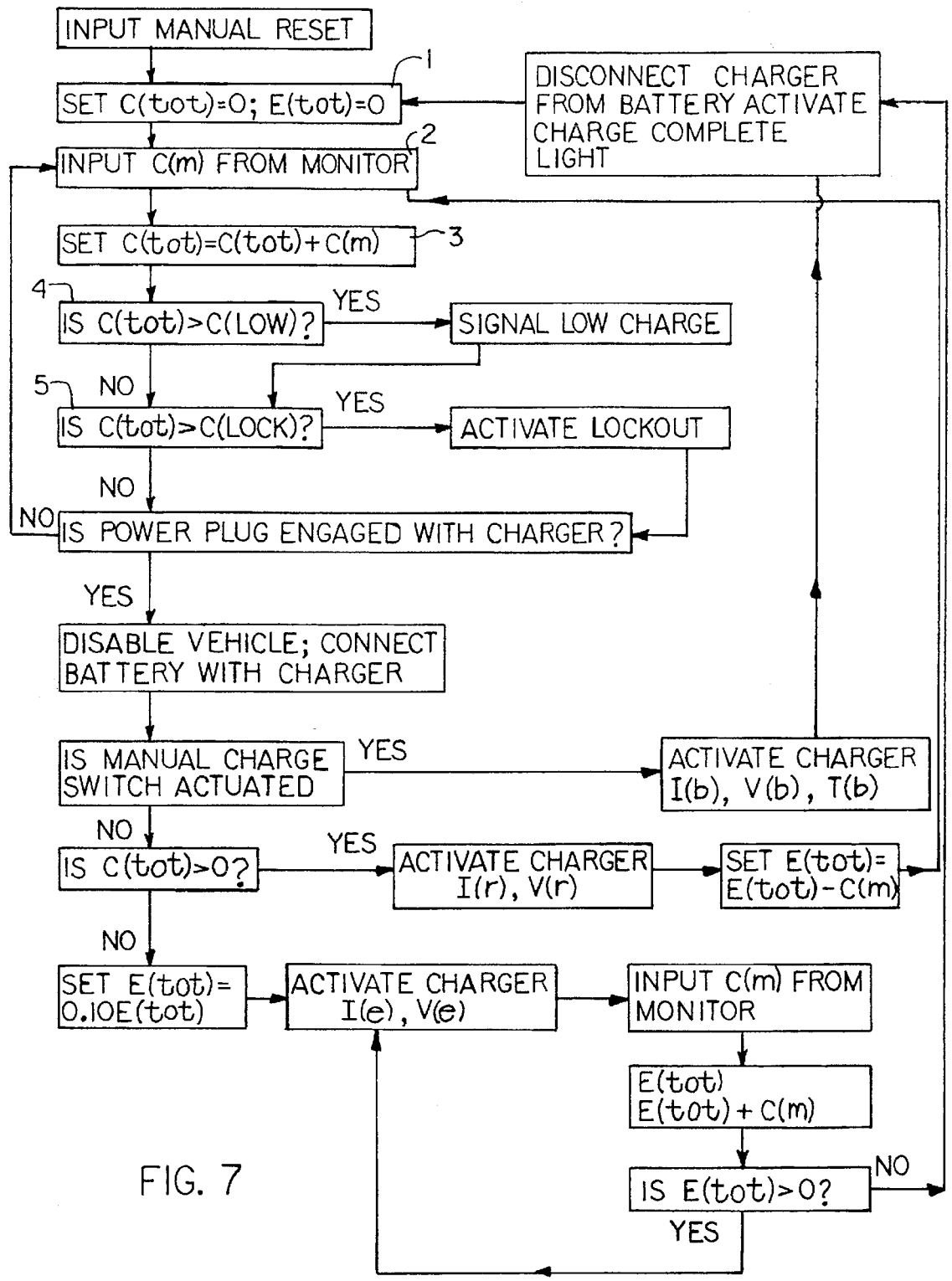
FIG. 7 is a schematic flow chart showing the logic of the charge controller of the present invention.

A more detailed description of the operation of the present invention can be given by reference to FIG. 7 which shows a schematic flow chart of the logic of charge controller 400.

Starting at block 1, the state of discharge variable C(tot) and an overcharge variable (hereinafter E(tot)) are set at zero. At block 2, programmable logic 440 inputs from monitor 300 the number of ampere-hours charged to or discharged from the battery since the last input, the value of which is denoted by the variable C(m). If the ampere-hours were discharged, C(m) will be a positive number. If the ampere-hours were charged, C(m) will be a negative number. In block 3, C(tot) is incremented by the number of ampere-hours read in the last input by calculating circuit 436. Hence, as the logic goes through the illustrated loop multiple times, the state of discharge will be integrated over time. In block 4, the actual state of discharge C(tot) is compared to the low charge reference value C(low) and, if appropriate, a low charge signal is given to the user via signal light 404.

At block 5, the actual state of discharge C(tot) is compared to the reference value corresponding to the state of discharge of which the user wants to disable the lift function of the vehicle C(lock). If appropriate, lift lock-out disable circuit 434 will activate the lift lock-out function.

The programmable logic will continue to integrate the value of the state of discharge C(tot), unless the charger is plugged in to a power source. If charger 200 is plugged in, programmable logic 440 will disable the locomotive function of the vehicle. In the embodiment mentioned above in which the charger is not carried by the vehicle, programmable logic will disable the locomotive function of the vehicle when battery when the battery is connected with the charger.

If the user has activated the manual charge switch, then charge controller 400 will cause charger 200 to apply boost charge at boost current I(b) and boost voltage V(b) until the voltage of the battery has achieved a set level. The battery voltage may be sensed by any conventional means. Thereafter, the charger will continue to charge for an appropriate length of time T(b). Once boost charge of the battery is completed, charge controller 400 will disconnect charger 200 from the battery and reset the variables at zero.

If manual charge switch 412 is not activated, then programmable logic 400 will go to block 9. Comparator circuit 438 will then compare the state of discharge C(tot) to zero, which represents equalization or full charge of the battery. If the battery is not fully charged, then charge controller 400 will activate charger 200 at recharge current I(r) and recharge voltage V(r) and will continue to charge the battery until the state of discharge has reached full charge. During this phase of the charging, E(tot) is used as a counter to measure the amount of charge required to restore the battery to full or equalized charge. Once the battery is fully charged, a preset overcharge, i.e. 3–10%, is administered. Charge controller 400 will then signal that the charge is complete, disconnect the charger from the battery, and reset the variables at zero.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. An integrated direct current power source unit for powering an electric vehicle, comprising:
   (a) battery charger;
   (b) a rechargeable lead acid battery having positive and negative terminals; and
   (c) a battery charger control unit for providing a charge from said battery charger to said battery with an amount of electrical energy less than required to fully charge said battery during a partial restoration and with an amount of electrical energy which corresponds to an effective sum of electrical energy withdrawn since a previous full charge plus a selected additional amount of energy to slightly overcharge said battery during a full restoration, said battery charger control unit comprising:
      (i) a charge monitor coupled to said terminals of said battery for determining the total flow of electrical energy into and out of said battery during any partial discharge and charge cycles since a previous full charge, wherein said charge monitor includes means for measuring a parameter corresponding to the amount of electrical energy charged to and discharged from said battery; and
      (ii) a charge controller for controlling the flow of electrical energy into said battery by said battery charger,
   (d) said battery, charger and charger control unit integrated together and carried by the vehicle to provide said single direct current power source unit.

2. The power source of claim 1 wherein said battery and said battery charger control unit are integrated.

3. The power source of claim 1 wherein said battery charger is integrated with said battery charger control unit.

4. The power source of claim 1 wherein said battery is of the type selected from the group consisting of valve regulated batteries, flooded antimonial batteries, and flooded calcium batteries.

5. The power source of claim 4 wherein said charge controller includes means for controlling a battery charger in accordance with the amount of electrical energy charged to and discharged from said battery as measured by said charge monitor.

6. The power source of claim 4 wherein said charge controller includes means for controlling a prescribed function of the vehicle in accordance with the amount of electrical energy charged to and discharged from said battery as measured by said charge monitor.

7. An electric vehicle, comprising:
   (a) an electrically-powered motor means for moving the electric vehicle;
   (b) an integrated power source carried by said vehicle comprising:
      (i) a rechargeable battery having positive and negative terminals for providing electricity to said motor means;
      (ii) a battery charger; and
      (iii) a battery charger control unit for providing a charge from a battery charger to said battery with an amount of electrical energy less than required to fully charge said battery during a partial restoration and with an amount of electrical energy which corresponds to an effective sum of electrical energy withdrawn since a previous full charge plus a selected additional amount of energy to slightly overcharge said battery during a full restoration, said battery charger control unit comprising:
         (A) a charge monitor coupled to said terminals of said battery for determining the total flow of electrical energy into and out of said battery during any partial discharge and charge cycles since the previous full charge; wherein said charge monitor includes means for measuring a parameter corresponding to the amount of electrical energy charged to and discharged from said battery; and
         (B) a charge controller for controlling the flow of electrical energy into said battery by said battery charger.

8. The electric vehicle of claim 7 wherein said battery and said battery charger control unit are integrated.

9. The electric vehicle of claim 7 wherein said battery charger and said battery charger control unit are integrated.

10. The power source of claim 7 wherein said battery is of the type selected from the group consisting of valve regulated batteries, flooded antimonial batteries, and flooded calcium batteries.

11. The electric vehicle of claim 7 wherein said charge controller is operative to calculate the state of charge of said battery and to control the charging of said battery by said battery charger in accordance with the state of discharge calculated.

12. The electric vehicle of claim 7 wherein said charge controller includes an actuating means to disable and enable a locomotive function of the vehicle when said charger is connected with an external power source.

13. A battery charger control unit integrated with a rechargeable lead acid battery having positive and negative terminals and a battery charger, comprising:
   (a) a charge monitor coupled to said terminals of said battery for measuring the total electrical energy charged to and discharged from the battery during any partial discharge and charge cycles since a previous full charge, wherein said charge monitor includes means for measuring a parameter corresponding to the amount of electrical energy charged to and discharged from said battery;
   (b) a charge controller for controlling the flow of electrical energy into the battery by the battery charger corresponding to an amount of energy less than required to fully charge said battery during a partial restoration and corresponding to an effective sum of electrical energy withdrawn since the previous full charge, plus a selected additional amount of energy to slightly overcharge said battery during a full restoration; and
   (c) said charge controller including a charger actuator means for activating and deactivating the charger responsive to the charge condition of the battery.

14. The battery charger control unit of claim 13 wherein said charge controller further including calculator means for integrating the amount of electrical energy charged to and discharged from the battery over time, and wherein said charger actuator means is operative to activate the charger to charge the battery when the value of said integration is within a first selected range of values and is further operative to deactivate the charger when the value of said integration is within a second selected range of values.

15. The battery charger control unit of claim 14 wherein said charge controller is operative to control the charger such that the amount of electrical energy charged to the battery is equal to the amount of electrical energy discharged from the battery since the battery's last charging, irrespective of the amount of that electrical energy.

16. The battery charger control unit of claim 14 further including signal actuating means for controlling a signal device, wherein said signal actuating means is operative to activate and deactivate the signal device when the value of said integration is within selected ranges of values.

17. The battery charger control unit device of claim 14 further including function actuating means for controlling a function of an associated vehicle, wherein said function actuating means is operative to activate and deactivate said function when the value of said integration is within a selected range of values.

18. The battery charger control unit of claim 17 wherein said function is a locomotive feature and said function actuating means is further operative to disable and enable said locomotive feature when the battery is connected with an external power source cord.

19. The battery charger control unit of claim 17 wherein said associated vehicle is a forklift truck, and wherein said function is a lift function of said forklift truck, and wherein said function actuating means is operative to disable and enable said lift function.

20. The battery charger control unit of claim 13 further including manual control means, wherein said charger actuating means is operative to activate the charger to deliver a selected amount of charge to the battery when said manual control means is actuated.

21. A method for automatically charging a battery having positive and negative terminals using a battery charger and a battery charger control unit, the battery charger control unit including a charge monitor and a charge controller, comprising the steps of:

(a) measuring at the terminals of the battery the total amount of electrical energy discharged from and charged to the battery during partial discharge and charge cycles since a previous full charge using the charge monitor;

(b) calculating a sum total of energy discharged from the battery according to measurements from the first step;

(c) inputting from the charge monitor to the charge controller a value corresponding to the sum of electrical energy measured in the calculating step;

(d) adding to the value a selected additional amount corresponding to a select amount of overcharging when fully charging the battery; and (e) controlling the charger using the charge controller such that the charger operates to slightly overcharge the battery.

22. The method of claim 21 wherein the reference value is the sum of the value inputted and an initial value corresponding to the sum total of energy discharged from the battery.

23. A method for automatically charging a battery having positive and negative terminals using a battery charger and a battery charger control unit, the battery charger unit including a charge monitor and a charge controller, comprising the steps of:

(a) measuring at the terminals of the battery the rate of charge to and the rate of discharge from the battery using the charge monitor during partial discharge and charge cycles since a previous full charge;

(b) inputting measurements obtained in the preceding step to the charge controller;

(c) integrating the measurements to obtain a charge state value; and (d) controlling the charger by means of the charge controller to charge the battery by an amount of the charge state value plus a selected additional amount to slightly overcharge said battery.

24. The apparatus of claim 1 wherein the energy is measured in ampere-hours and said selected additional amount of energy to slightly overcharge said battery, during a full restoration is a predefined percentage of said effective sum of energy withdrawn since a previous full charge measured in ampere-hours.

25. The apparatus of claim 7 wherein the energy is measured in ampere-hours and said selected additional amount of energy to slightly overcharge said battery, during a full restoration is a predefined percentage of said effective sum of energy withdrawn since a previous full charge measured in ampere-hours.

26. The apparatus of claim 13 wherein the energy is measured in ampere-hours and said selected additional amount of energy to slightly overcharge said battery, during a full restoration is a predefined percentage of said effective sum of energy withdrawn since a previous full charge measured in ampere-hours.

27. The method of claim 21 wherein the value corresponds to energy measured in ampere-hours and the selected additional amount corresponding to a select amount of overcharging corresponds to a predefined percentage of the sum total of energy discharged from the battery.

28. The method of claim 23 wherein the charge state value corresponds to an amount of energy in ampere-hours and the selected additional amount corresponds to a predefined percentage the charge state value.

* * * * *